No. 676,565. Patented June 18, 1901.
M. LINDSAY.
CONVEYER BELT.
(Application filed Feb. 11, 1901.)
(No Model.)
Fig. 1.
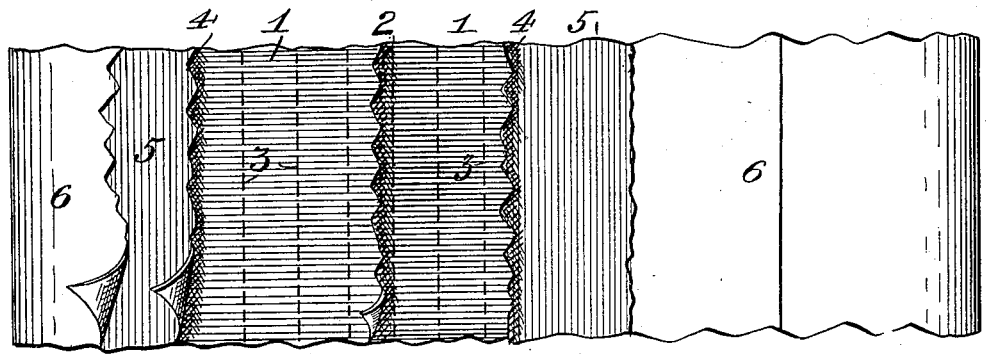
Fig. 2.
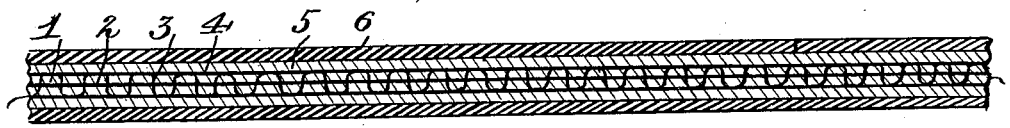
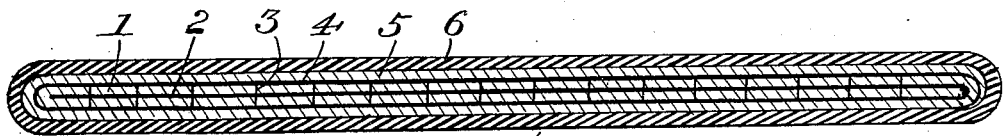
Fig. 3.
Witnesses
Franck L. Ourand
W. Parker Reinohl
Inventor
Melville Lindsay.
By D. C. Reinohl
Attorney

UNITED STATES PATENT OFFICE.

MELVILLE LINDSAY, OF WASHINGTON, DISTRICT OF COLUMBIA.

CONVEYER-BELT.

SPECIFICATION forming part of Letters Patent No. 676,565, dated June 18, 1901.

Application filed February 11, 1901. Serial No. 46,884. (No model.)

*To all whom it may concern:*

Be it known that I, MELVILLE LINDSAY, a citizen of the United States, residing at Washington, in the District of Columbia, have invented certain new and useful Improvements in Belting; and I do hereby declare the following to be a full, clear, and exact description of the invention, such as will enable others skilled in the art to which it appertains to make and use the same.

My invention relates to belting, has especial reference to that class of belting known as "conveyer-belts," used in connection with brick and other machines for conveying clay or other moist material to the machine, but is not limited thereto, as it may be used for driving machinery, such as dynamos and other machines requiring a superior quality or high grade of belting, and consists in certain improvements in construction whereby the durability of the belting is greatly increased, as will be fully set forth in the following specification and claims.

In the accompanying drawings, which form part of this specification, Figure 1 represents a top plan view of my improved belting with parts of the strata and courses broken away. Fig. 2 is a vertical longitudinal section on an enlarged scale to more clearly illustrate the several strata and courses of material composing the belt, and Fig. 3 a vertical transverse section of the same.

Reference being had to the drawings and the designating characters thereon, 1 indicates the center courses, preferably of fabric, such as canvas-duck, and of which there may be two or more, according to the thickness or number of plies of the belt.

2 indicates an interposed stratum of rubber cement, known to the trade as "friction" or "fusion."

3 indicates thread or wire extending through the courses and by which the courses 1 are sewed together and secured against the possibility of separation by the whipping of the belt, as frequently occurs in use.

4 indicates a stratum of rubber cement—friction or fusion—on the outside of the center courses 1. 5 indicates a course, preferably of fabric, such as canvas-duck, on each side of the belt and covering of the stratum 4, and 6 indicates the outer stratum, covering, or working surface on each side of the belt, of rubber, rubber compound, or other moisture-repellant material, which extends over the edges of the belt, as shown in Fig. 3, and completely incases the several courses and strata of the composite structure and prevents any moisture being absorbed thereby and the rotting, rusting, and deterioration of the material by which the courses 1 are secured together. The stitches are also protected against wear by being embedded in or incased by the stratum of cement 4, the courses of fabric 5, and the outer stratum of rubber 6.

The several strata and courses are applied and assembled in the usual manner of making what are known to the trade as "rubber belts," and the belting is treated in like manner for vulcanizing the rubber.

In the practical use of belting constructed as described and applied as conveyer-belts its durability has been demonstrated to have been increased fully one hundred per cent. over that of the ordinary rubber belting of commerce.

Having thus fully described my invention, what I claim is—

1. As an improved article of manufacture, a conveyer-belt consisting of a plurality of courses of canvas-duck cemented and stitched together, a stratum of rubber cement on each side of said courses, a course of canvas-duck on each side of the belt and covering the stitched courses, and a stratum of rubber or rubber compound applied to the outside of said courses of canvas-duck and incasing the belt.

2. As an improved article of manufacture, a conveyer-belt consisting of a plurality of courses of canvas-duck cemented and stitched together, a stratum of rubber cement on each side of said courses, a course of canvas-duck on the outside of and covering the stitched courses, and a stratum of rubber or rubber compound applied to the outside of said courses of canvas-duck and incasing the belt.

In testimony whereof I affix my signature in presence of two witnesses.

MELVILLE LINDSAY.

Witnesses:
 D. C. REINOHL,
 W. PARKER REINOHL.